(12) United States Patent
Wold

(10) Patent No.: US 7,523,384 B2
(45) Date of Patent: Apr. 21, 2009

(54) METHOD AND DEVICE FOR MONITORING AND FAULT DETECTION IN INDUSTRIAL PROCESSES

(75) Inventor: Svante Wold, Umeå (SE)

(73) Assignee: Umetrics AB, Umea (SE)

( * ) Notice: Subject to any disclaimer, the term of this patent is extended or adjusted under 35 U.S.C. 154(b) by 567 days.

(21) Appl. No.: 10/519,569

(22) PCT Filed: Jun. 27, 2003

(86) PCT No.: PCT/SE03/01134

§ 371 (c)(1),
(2), (4) Date: Feb. 18, 2005

(87) PCT Pub. No.: WO2004/003671

PCT Pub. Date: Jan. 8, 2004

(65) Prior Publication Data

US 2005/0268197 A1    Dec. 1, 2005

Related U.S. Application Data

(60) Provisional application No. 60/392,407, filed on Jun. 28, 2002.

(30) Foreign Application Priority Data

Jun. 28, 2002    (SE) .................................... 0202024

(51) Int. Cl.
*G06F 11/00*    (2006.01)
*H03M 13/00*    (2006.01)
*H04L 1/00*    (2006.01)

(52) U.S. Cl. ........................... 714/799; 700/30; 700/52; 702/196; 702/179; 703/2; 703/16

(58) Field of Classification Search ................. 714/799; 700/30, 52; 702/196, 179; 703/2, 16
See application file for complete search history.

(56) References Cited

U.S. PATENT DOCUMENTS

| 5,408,405 A | 4/1995 | Mozumder et al. |
| 5,751,582 A | 5/1998 | Saxena et al. |
| 6,549,864 B1 * | 4/2003 | Potyrailo ..................... 702/81 |
| 7,062,417 B2 * | 6/2006 | Kruger et al. .................. 703/2 |

FOREIGN PATENT DOCUMENTS

| EP | 0537041 A1 | 4/1993 |
| JP | 2002-157003 | 5/2002 |
| WO | WO 9919780 A1 | 4/1999 |
| WO | WO 0129630 A1 | 4/2001 |

OTHER PUBLICATIONS

Patent Abstracts of Japan, Vo. 2002, No. 09, Sep. 4, 2002 & JP 2002157003 A (Fuji Electronic Co. Ltd.), May 31, 2002.

* cited by examiner

*Primary Examiner*—Guy J Lamarre

(57) ABSTRACT

A method for monitoring of and fault detection in an industrial process, comprising at least a first sub-process and at least one second sub-process arranged in a process chain, comprising, for the at least one second sub-process the steps of collecting data and calculating a multivariate sub-model based on the collected data, said method being characterized by the steps of receiving in the first sub-process from the at least second sub-process information related to the multivariate sub-model calculated for the at least second sub-process, collecting data related to the first sub-process, and calculating a multivariate sub-model for the first sub-process based on collected data and received information.

17 Claims, 4 Drawing Sheets

METHOD AND DEVICE FOR MONITORING AND FAULT DETECTION IN INDUSTRIAL PROCESSES

CROSS-REFERENCE TO RELATED APPLICATION

This application claims the benefit of U.S. Provisional Application Ser. No. 60/392,407 filed on Jun. 28, 2002.

BACKGROUND OF THE INVENTION

1. Field of Invention

The present invention relates to a method and a device of monitoring and fault detection in industrial processes. More specifically, the present invention relates to a method of applying multivariate techniques in the sequential transfer of quality parameters by means of score values and monitoring the process with early fault detection.

2. Description of Related Art

In today's world of outsourcing, many of the steps in manufacturing process are actually made by other companies than by the company responsible for the final product. Examples of products assembled in such a way include cars, computers, and telephone exchanges. The same approach applies to a product manufactured in several steps without assembly, e.g., a pharmaceutical tablet, a roll of printing paper, or a wafer in a semiconductor process. Sequential manufacturing makes for a strong need of tracking quality data through the whole manufacturing tree, assuring that all components and sub-components, as well as their combinations, have adequate quality, faults are early (high up) discovered in the tree, etc. When multiple data are measured in process steps and component quality testing, only multivariate tools can adequately use the information to evaluate the quality in the tree of manufacturing steps.

The products of today must meet increasing quality demands. The product quality is measured by many parameters and depends on many process variables in each step of the process chain. During each manufacturing step, process data are measured at certain intervals to control and monitor the process, and after each step intermediate quality data are measured on the sub-components and components, and then final quality data are measured on the final product. However, even if many quality measurements are used, with reliance on traditional Statistical Process Control (SPC) the small tolerated variation of each component leads to major difficulties, and rejection of a portion of well working product.

Several techniques are used for the purpose of monitoring a process. Parameters to check include quality, yield, energy, product rejection, etc. A conventional approach for monitoring a process is to consider one variable at a time (univariate SPC). This approach is not adequate for obtaining the best quality, economy, etc. of a product in a manufacturing process, since actually several variables are involved.

The most commonly employed type of SPC uses single variable control charts. When a given product or process is outside of a specification it is indicated. The limitation with SPC is that only few variables, generally at the most around 5, can be used for monitoring the process.

The quality of intermediate and end products is in most cases described by values of a set of variables, the product specification. The specifications are often used in a univariate mode, i.e. they are checked individually for conformation within the specification value range. This gives rise to both false negative and false positive classification, since the quality variables very rarely are independent in practice, but are treated as if they were, i.e. univariately.

It is possible to use traditional SPC to establish when a process is out of specification when only a few variables are involved. However, when the number of process variables and quality increase or when they interact, problems arise. Very often it is difficult to determine the source of the problem, particularly when the number of process variables increases. Product quality is typically a multivariate property and must be treated as such in order to monitor a process in that respect.

In order to optimize and control a process with several variables, projection techniques such as Principal Components Analysis (PCA) and Projection to Latent Structure (PLS) have been applied. These techniques are well described (Mac Gregor et. al.) and further development has been made to address the process control need of today. S. Wold et al., "Hierarchical multi-block PLS and PC models, for easier interpretation, and as an alternative to variable selection," J. CHEMOMETRICS 10 (1996), pages 463-482, describes a method where variables are divided into conceptually meaningful blocks before applying hierarchical multi-block PLS or PC models. This allows an interpretation focused on pertinent blocks and their dominant variables. Such blocking can be used in process modeling and modeling.

Attempts based on SPC and projection techniques have been made to control a process. For example, WO 99/19780 describes a method and device for controlling an essentially continuous process comprising at least two sub-processes, which minimizes the rejection of the produced product. The method is based upon combining multivariate models with a processed variable value. A variable value for a subsequent second sub process is predicted based on the combination of the multivariate model and the processed variable value. However, the method only utilizes multivariate data analysis with respect to controlling the process and not for checking or monitoring it. Furthermore, the method is applied only for a specific application and cannot be used in general applications.

C. WIKSTROM et al., "Multivariate process and quality monitoring applied to an electrolysis process," Part 1. Process supervision with multivariate control charts Chemometrics and intelligent laboratory system 42 (1998) pages 221-231), describes Multi-variate Statistical Process Control (MSPC) applied to an electrolysis process and the benefit with multivariate analysis over traditional univariate analysis also is discussed Moreover, the article shows how the result from a multivariate principal component analysis method can be displayed graphically in multivariate statistical control charts. By using this informationally efficient MSPC approach, rather than any inefficient SPC technique, the potential of achieving major improvements in the under-tanding and monitoring of the process is shown. The improvements are, however, not sufficient to be able to control the quality problems in complex processes unless specific experimentation has been made to make the multivariate model invertable and thus also capable to determine how the process should be modified to minimize deviation from the specification profile. In MSPC as well as SPC "controlling" should be synonymous with "checking" or "monitoring".

Another drawback with the application of prior art to sequential manufacturing is the need to carry relevant information from different process steps in a process chain, which cannot be easily achieved by known techniques. Therefore, a need exists to describe product quality in a sequential monitoring process by a multivariate model of the relevant quality variables rather than the individual variables themselves.

A problem with prior art (univariate SPC) is that the quality variables are not independent, but their interdependencies get lost if they are analyzed or monitored individually. The risk for false product approval increases and when this occurs and is fed back in the supply chain the specification intervals are usually narrowed in order to secure product. However, this rarely eliminates the problem of false product approval and also give rise to substantial false rejects.

SUMMARY OF THE INVENTION

The present invention is directed to overcoming the problems set forth above especially to monitor and detect faults at the earliest possible stage in a process chain.

This is accomplished according the invention by a method for monitoring of and fault detection in an industrial process, comprising at least a first sub-process and at least one second sub-process arranged in a process chain, comprising, for the at least one second sub-process the steps of collecting data and calculating a multivariate sub-model based on the collected data, said method being characterized by the steps of receiving in the first sub-process from the at least second sub-process information related to the multivariate sub-model calculated for the at least second sub-process, collecting data related to the first sub-process, and calculating a multivariate sub-model for the first sub-process based on collected data and received information.

The current invention provides a method and a device for multivariate quality assessment and sequential transport of quality measures between subsequent producing entities. Early fault detection in the process chain is achieved by fault diagnosis tools such as outlier detection etc., and on-line monitoring of new data measured from the beginning of the manufacture chain. This methodology has several advantages compared to traditional univariate quality assessment. The risk for false product approval decreases. Multivariate quality assessment allows the number of quality variables to increase and still be meaningful as product specification. This is due to the inherent capability of multivariate techniques to reduce dimensionality with-out losing relevant information in the data. This allows for instance inclusion of en-tire spectra from spectroscopic measurements to be used as quality assessment. Near Infra Red (NIR) spectroscopy has become increasingly used for this purpose.

It is also possible to predict product properties directly from the process, i.e. to translate the production state into predicted product properties. This is sometimes called soft sensors.

In multivariate quality assessment the quality data from good product samples are used to build a multivariate model using PCA or PLS. Each produced unit is then projected on this model and classified according to its dissimilarity to the model.

The current invention uses multivariate models in sequence. The producing entity applies a multivariate model for describing the quality. This model consists of a number of latent variables, the same latent variables are used by the receiving entity as a means of checking the quality of each delivered unit. But they can also be used as X-variables in the receiving entity's process step to give quality assessment of each individual step taken into use into the further processing.

The data are arranged in a dynamically updated tree with the root being the final product data and each branch and twig being the data of a component or sub-component.

This feature concerns a novel method to analyze multivariate data from a tree structured manufacturing process. In a preferred embodiment this novel method gives information about each manufacturing step and its results, as well as the combined influence of all upstream ("up-tree") steps on later steps and on the final product. Preferably the novel approach allows the detection of faults and upsets in separate steps as well as in combinations of several or all steps, and points to which process variables and steps that together are related to these faults. Thus, an over-view of all the process data are obtained in a way corresponding to the structure of the process, providing information about the overall quality as well as the quality of each individual step.

Preferably this novel approach provides an adequate infrastructure to monitor a complicated chain of components manufacturing and assembly in such a way that the adequate quality of the final product is assured. Pertinent graphics are included, showing the status of the overall chain as well as parts and individual steps in terms of one-, two-, and three-dimensional multivariate control charts. Additional multivariate plots are included for the detailed interpretation of the patterns seen in these control charts.

The novel approach is discussed herein as applied to the discrete manufacturing of a product consisting of components and sub-components, e.g., a computer, a telephone, a car, or a camera. Precisely the same approach applies also to a product manufactured in several steps without assembly, e.g., a pharmaceutical tablet, a roll of printing paper, or a wafer in a semiconductor process.

The present invention also provides a computer program product comprising computer readable code means which, when run on a computer system, makes the computer system perform the steps set forth above. In particular, the computer program product may comprise computer readable code means which, when run on a computer system, makes the computer system perform the following additional step: transmitting relevant information or data to a third sub-process.

DEFINITIONS

Figure 1:
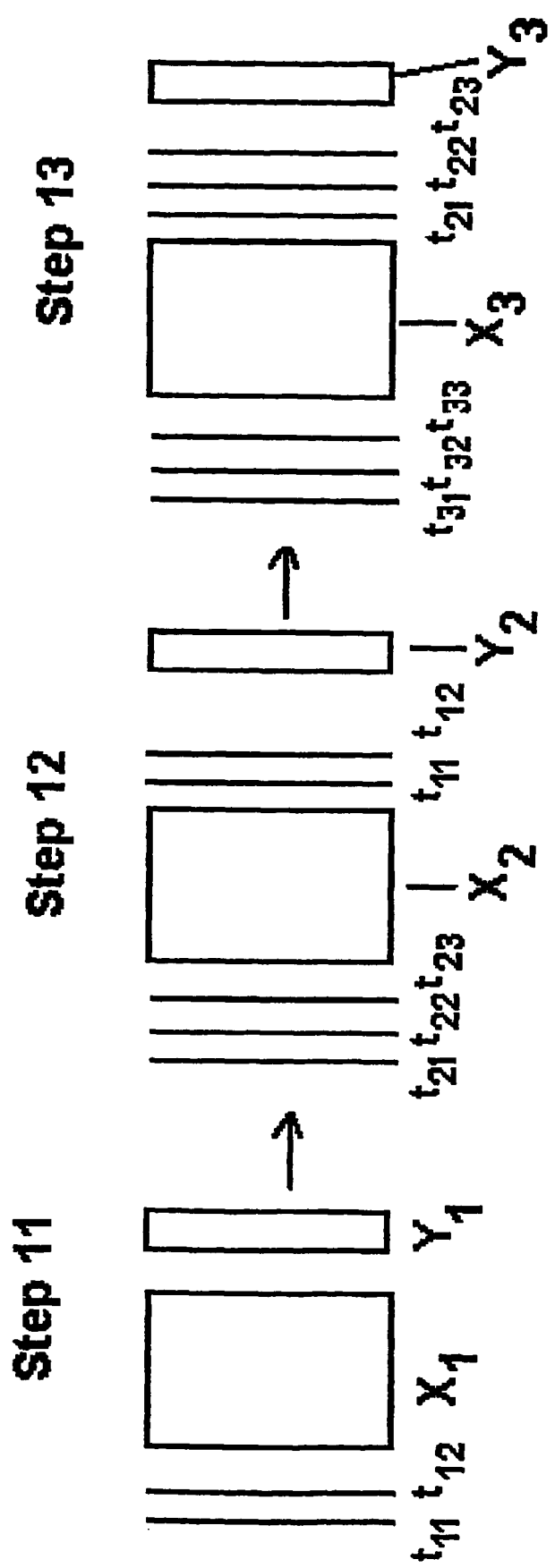
FIG. 1 shows the information flow in a simple straight chain sequence and quality data Y.

The following are definitions of terms used here.

An "industrial process" means a process comprising one or several steps performed within that specific process or one or several steps performed at sub processes, and could be described as a multivariate process.

Bold characters are used for vectors and matrices, lower case for vectors, e.g., u, and upper case for matrices, e.g., X.

The process consists of J steps (j=1, 2, . . . , J), where we assume that the last (J) is the final step, giving the final product.

One "NIPALS-PLS round" means from present u's (local and from chain below), use an average of these u's, multiply that into X to give w', normalize w, calculate t and X w, and finally c as t'Y/(t't).

The training set is the historical data measured on all steps from instances of accept-able product, N observations with the individual index I (I=1, 2, . . . , N), this data will be used to develop a model of how data in all steps and in their combination should look for acceptable product.

On each step (j) multiple process variables ($X_{jk}$) are measured, with the value of the individual observation being $X_{ijk}$. For step j, the training set data comprise the matrix $X_j$.

Optionally, after each step (J), quality variables ($Y_{jm}$) are measured, with the value of the individual observation being $Y_{ijm}$. For step j, the training set data comprise the matrix $Y_j$. For steps lacking quality data (y), principal components like calculations will be made, for steps having quality data PLS like calculation will be made.

A coefficient $b_{jk}$ shows how much a variable$_{xjk}$ contributes to the model of step 11.

A sub-process is a process step in a straight process chain, a forked process chain or a combination of both.

A sub-model is a multivariate model calculated for a specific subprocess, which can include information from one or several sub-models.

Outliers could be samples that are out of a specification, outside a process control limit, etc.

The items displayed in a score plot are the score values of the observations for a specified set of model components (model dimensions), often components one and two, or one, two, and three. The score values are weighted averages of all variables (measurements, properties) with the weights determined by (a) the loadings of the variables of the specified model components, and (b) the scaling parameters of the corresponding model. Thus, the scores are new variables that constitute summaries of the original variables. Deviations in the score values of an observation from the normal intervals of these scores indicate the observation to be different from the ones situated within the normal score intervals; it is an outlier.

A scaled raw data (contribution) plot for an observation, shows the difference between its individual variable values in scaled form and the corresponding scaled values of a reference observation. This reference observation is often the (hypothetical) average of all "good" observations (giving good final quality) in the training set, or the set point of manipulated variables together with the average values of the other variables. The scaled raw data (contribution) plot indicates which combination of variables that is related to the significant deviation of the observation (making it an outlier)-these are the variables deviating the most from their "normal" values.

Thus the scaled raw data (contribution) plot is useful for finding the reason for an observation deviating from the "normal" ones, as seen in, for instance, a score plot or a residual std dev (DModX) plot.

A residual std dev (DModX) plot describes how much the scaled data vector of each observation differs from its "ideal", this being the model value of the observation, i. E., the weighted sum of the model loadings with the weights being the score values of the observation. A large residual std dev (DModX) value, significantly outside its normal range, indicated that this observation deviates from the model of the normal observations, it is an outlier. The indications for process upsets are often seen first in the residual std dev (DModX) plot.

DETAILED DESCRIPTION OF THE INVENTION

In the following the invention will be described in more detail by means of examples which are provided for illustrative purposes only and are not intended to limit the scope of the invention.

Like any modeling, sequential multivariate modeling is made in two phases, as follows:

(1) A "training" phase based on historical data leading to a multivariate model (In the present case this consists of a chain of multivariate submodels); and (2) A "prediction" phase where the model from phase (1) is used to evaluate new incoming data to detect deviations from "normal operation", and to predict properties of the resulting product or intermediate product of a subprocess.

In the present case of sequential modeling, historical data are collected for each step in the manufacturing process chain, and a sub-model is developed for each such step. The models are then connected in a chain corresponding to the process chain (this connection can be done in several slightly different ways), and in the prediction step applied on-line to production data for diagnosis and quality assessment and prediction of quality further down the chain.

Early fault detection in the process chain is achieved by fault diagnosis tools such as outlier detection etc. Plots such as contribution, score, coefficients etc. can be used as diagnosis tools. On-line monitoring of new data measured from the beginning of the manufacture chain, give information about the status of the process chain in total as well as each of its steps, and identifies the from normal process operation in outliers in scores and other diagnostic plots.

EXAMPLES

In the following two small examples we will indicate how information from one step of a sequential process can be carried "down stream" by means of scores of a multivariate model of the step. Subsequent steps will use these scores as variables together with the process variables in those subsequent steps.

In this way one gets a monitoring approach, in which a) each intermediate product meets specification and in which b) all intermediate products from different process streams fit together in intermediate and final products. In addition to process monitoring and only fault detection, this can be used, for instance, to match inter-mediates when the intermediate product differs in size, large ones go together, and small ones go together or, just to make sure that the final product has all properties in the right proportion, including those of its components.

To illustrate the models, information flow and algorithms, two small illustrative examples are given below with only 5 observations and three steps in each.

The simplest sequential algorithm is used for the illustration, where separate standard two block (X, Y) PLS models (no hierarchical structure) are made for the "left end" blocks of each chain, I. E., block (XI, Y1) in FIG. 1, and blocks (X4, Y4) and (X5, Y5) in FIG. 2. Thereafter, the scores (t11, t12, t41, t42, t5) of these blocks are included as extra process variables in the blocks (X2, X6) next to the right (down stream) of these "end blocks", and PLS models made of these blocks. The resulting scores are then used as extra process variables in the blocks next to the right (down stream), etc., until the end.

Figure 2:
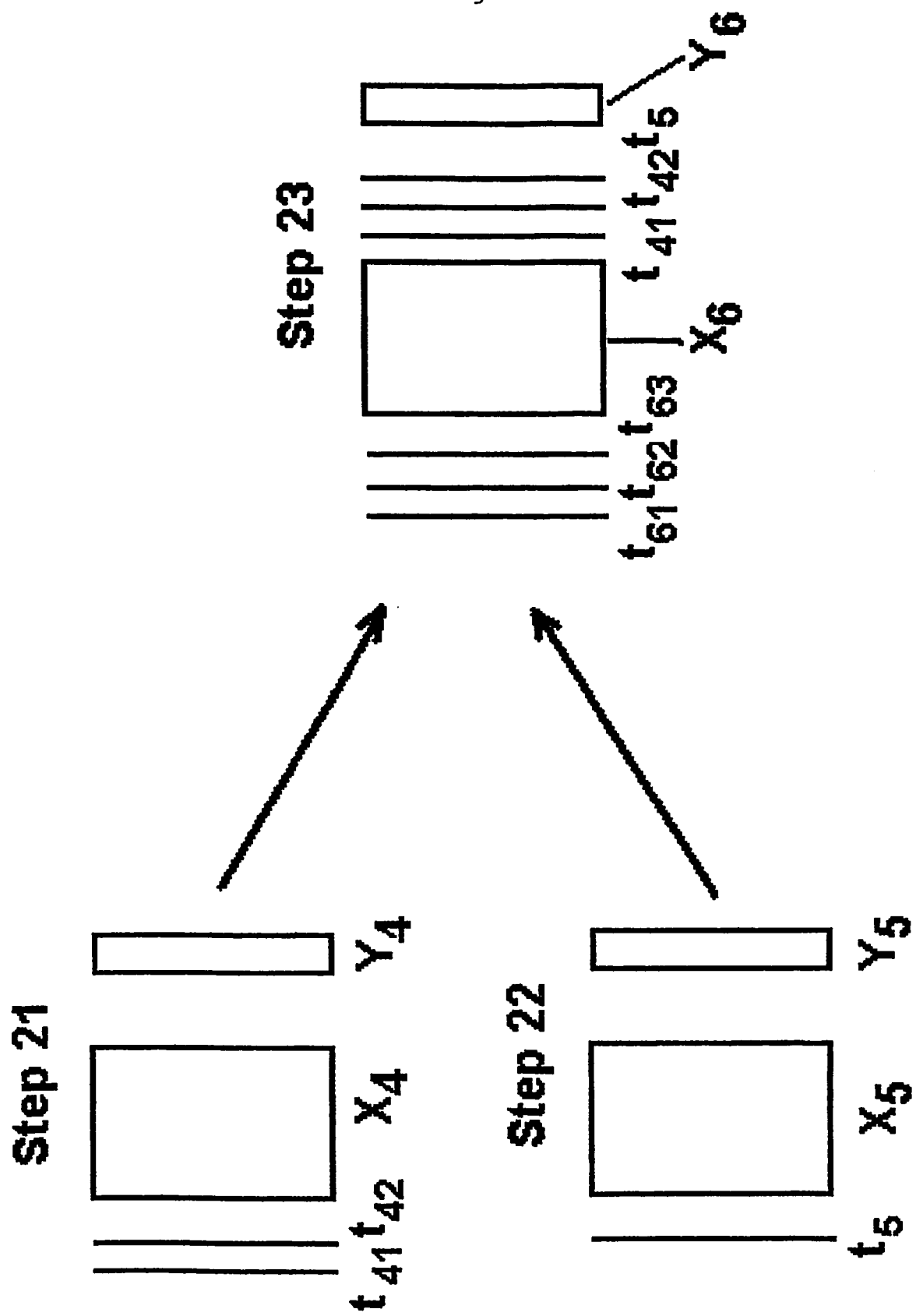
FIG. 2 shows the information flow in a simple example of a "forked" sequence.

This simplest way of calculation gives two PLS-components for step 11 in FIG. 1, the same for step 21 in FIG. 2, and one component for step 22 in FIG. 2.

Referring to FIG. 1, a straight chain sequence in three steps is shown. We may think of this as a very simple example of a pharmaceutical manufacturing, where a tablet is made in three consecutive steps; granulation (step 11), mixing (step 12), and tabletting (step 13). The three model properties are shown in table 1.

TABLE 1

| Model | Number of variables (X's) | Number of t's from previous step | Number of measured quality variables (Y's) | Resulting number of PLS components |
|---|---|---|---|---|
| step 11 | 4 | — | 2 | 2 |
| step 12 | 3 | 2 | 1 | 3 |
| step 13 | 3 | 3 | 2 | 3 |

Step 11: This first step 11 simulates a simplified granulation with four process variables (e.g., temperature (x11), flow (x12), concentration (x13), spray pressure x14)) and two measured quality variables (responses), e.g., granulate particle size (y11) and homogeneity (y12) (standard deviation of particle size). The data values below have been centered (average subtracted) and scaled, to make them uninteresting as such.

Table 2 shows data X1=[x11, x12, x13, x14] and Y1=[y11, y12] of step 11, together with resulting two score vectors t11 and t12, and PLS coefficients w* and c. In the PLS model, the scores are calculated from the raw data as: $T_{ia} = \Sigma_k x_{ik} w_{ak}^*$, and each y-vector is modeled by the scores as: $y_{im} = \Sigma_a t_{ia} c_{am} + F_{im}$ (residuals), or, equivalently, $y_{im} = \Sigma_k x_{ik} b_{mk} + F_{im}$. The data are analyzed in original form, with no additional centering or scaling.

TABLE 2

| obs/vec | x11 | x12 | x13 | x14 | y11 | y12 | t11 | t12 |
|---|---|---|---|---|---|---|---|---|
| 1 | 0.188 | 0.076 | 0.175 | 0.091 | 0.248 | 0.191 | 0.280 | 0.062 |
| 2 | −0.316 | 0.029 | −0.367 | −0.379 | −0.314 | −0.250 | −0.553 | 0.143 |
| 3 | 0.599 | 0.023 | 0.561 | 0.591 | 0.624 | 0.563 | 0.951 | −0.127 |
| 4 | −0.033 | 0.312 | −0.213 | −0.335 | 0.028 | 0.139 | −0.175 | 0.435 |
| 5 | −0.438 | −0.441 | −0.156 | 0.032 | −0.587 | −0.644 | −0.503 | −0.513 |
| 6 | 0.63 | 0.061 | 0.587 | 0.507 | | | 0.963 | −0.047 |
| 7 | 0.83 | 0.001 | 0.9 | 0.807 | | | 1.366 | −0.212 |
| w* and c 1 | 0.699 | 0.295 | 0.514 | 0.401 | 0.717 | 0.653 | | |
| w* and c 2 | 0.368 | 0.813 | −0.139 | −0.487 | 0.415 | 0.600 | | |
| b y11 | 0.653 | 0.549 | 0.311 | 0.085 | | | | |
| b y12 | 0.677 | 0.680 | 0.253 | −0.031 | | | | |

Data (X1 and Y1), scores (t11 and t12), and model coefficients (w*, c, and b) of step 11 are shown in table 2. Observations 6 and 7 constitute the "prediction set", which is not used for model development, but rather to simulate the "on-line" monitoring of the process at a later stage.

Figure 3:
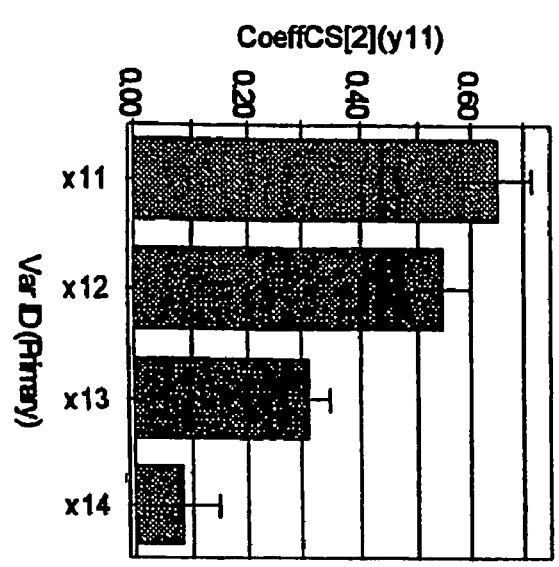
FIG. 3 shows PLS regression coefficients (b) for step 11, y11 (left), x11 and x12 are seen to dominate both y-models, and x14 is unimportant.
Figure 4:
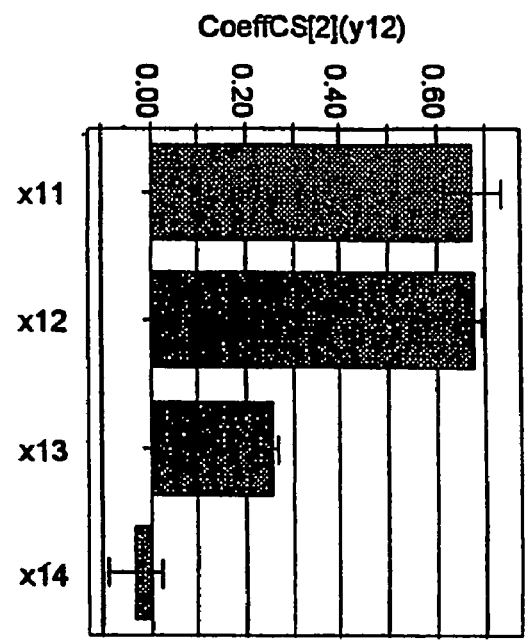
FIG. 4 shows PLS regression coefficients (b) for step 11, y12, x11 and x12 are seen to dominate both y-models, and x14 is unimportant.

The regression coefficient plot of y11 shown in FIG. 3 indicates that variables x11 and x12 dominate the y11-model and that x14 is unimportant. The regression co-efficient plot of y12 shown in FIG. 4 indicates that variables x11 and x12 dominate the y12-model and that x14 is unimportant. Further the variable x13 is seen to be about half as important as the dominating variables x11 and x12 in both y-models.

Step 12: Simulated mixing step 12 has three process variables, including feed rate of the constituents (x21), stirring rate (x22), and mixing time (x23). There is one y-variable, the resulting homogeneity (y2). As in step 11, the data are centered and scaled to make them uninteresting as such.

In step 12, the influence of step 11 is modeled by means of the two scores resulting in the step 11 model. These two vectors (t11 and t12) are appended to the X2-matrix of step 12 to give totally five variables (x21, x22, x23, t11, and t12) in the X-matrix of step 12. The PLS analysis of these data gives three components, the scores of which are used as additional variables in step 13. Step 12 data (X2 augmented with the two scores of step 11, and Y2), scores (t21, t22, and t23), and Y=Y2, and models coefficients (w*, c, and b), are shown in table 3.

TABLE 3

| obs/vec | x21 | x22 | x23 | t11 | t12 | y2 | t21 | t22 | t23 |
|---|---|---|---|---|---|---|---|---|---|
| 1 | −0.364 | −0.355 | −0.287 | 0.280 | 0.062 | −0.336 | −0.339 | −0.278 | 0.364 |
| 2 | 0.197 | 0.096 | 0.164 | −0.553 | 0.143 | −0.250 | −0.121 | 0.227 | −0.456 |
| 3 | 0.427 | 0.454 | 0.423 | 0.951 | −0.127 | 0.979 | 1.091 | −0.347 | −0.026 |
| 4 | −0.358 | −0.279 | −0.395 | −0.175 | 0.435 | −0.840 | −0.726 | −0.334 | −0.104 |
| 5 | 0.098 | 0.084 | 0.095 | −0.503 | −0.513 | 0.447 | 0.095 | 0.731 | 0.221 |
| w* and c 1 | 0.448 | 0.436 | 0.453 | 0.481 | −0.416 | 1.005 | | | |
| w* and c 2 | 0.064 | 0.049 | 0.091 | −0.568 | −0.830 | 0.340 | | | |
| w* and c 3 | −0.409 | −0.282 | −0.303 | 0.305 | −0.909 | 0.380 | | | |
| b y2 | 0.317 | 0.347 | 0.371 | 0.406 | −1.046 | | | | |

Step 13, In this simulated tabletting step 13, there are three process variables, including punching pressure (x31), machine speed (x32), and filling rate (x33). There are two y-variables, the resulting tablet hardness (y31) and uniformity (y32). As previous steps, the data are centered and scaled.

In step 13, the influence of step 12 (and indirectly of step 11) is modeled by means of the three scores resulting in the step 12 model. These three vectors (t21, t22, and t23) are appended to the X3-matrix of step 13 to give totally six variables (x31, x32, x33, t21, t22, and t23) in the X-matrix of step 13.

The PLS analysis of these data gives three components, denoted t31, t32, and t33 below. Step 13 sq data (X3 augmented with the three scores of step 12, and Y=Y3) and model coefficients (w*, c, and b) are shown in table 4.

TABLE 5

| Model | Number of variables (X's) | Number of t's from previous step | Number of measured parameters (Y's) | Resulting number of PLS components |
|---|---|---|---|---|
| step 21 | 4 | — | 2 | 2 |
| step 22 | 3 | — | 1 | 1 |
| step 23 | 3 | 3 | 2 | 3 |

Step 21 in FIG. 2 is simulated to have the same data as step 11 above shown in table 2, i.e. X1=X4, Y1=Y4, t11=t41, and t12=t42, and is hence not further discussed.

Of course the variables here (for a computer motherboard manufacturing) are different from those of a pharmaceutical

TABLE 4

| obs/vec | x31 | x32 | x33 | t21 | t22 | t23 | y31 | y32 | t31 | t32 | t33 |
|---|---|---|---|---|---|---|---|---|---|---|---|
| 1 | 0.409 | −0.120 | 0.180 | −0.339 | −0.278 | 0.364 | 0.633 | −0.128 | −0.105 | 0.526 | 0.499 |
| 2 | −0.098 | 0.086 | −0.013 | −0.121 | 0.227 | −0.456 | −0.446 | −0.189 | −0.179 | −0.152 | −0.478 |
| 3 | 0.099 | 0.479 | 0.301 | 1.091 | −0.347 | −0.026 | 0.411 | 1.310 | 1.269 | −0.047 | −0.039 |
| 4 | −0.156 | 0.075 | −0.086 | −0.726 | −0.334 | −0.104 | 0.422 | −0.875 | −0.544 | 0.547 | −0.226 |
| 5 | −0.254 | −0.520 | −0.382 | 0.095 | 0.731 | 0.221 | −1.020 | −0.117 | −0.441 | −0.874 | 0.244 |
| w* and c 1 | 0.178 | 0.337 | 0.279 | 0.835 | −0.280 | 0.049 | 0.353 | 1.044 | | | |
| w* and c 2 | 0.272 | 0.264 | 0.262 | −0.489 | −0.736 | 0.081 | 1.102 | −0.349 | | | |
| w* and c 3 | 0.376 | −0.397 | 0.041 | 0.094 | −0.061 | 0.836 | 0.286 | 0.247 | | | |
| b y31 | 0.470 | 0.297 | 0.399 | −0.217 | −0.927 | 0.345 | | | | | |
| b y32 | 0.183 | 0.161 | 0.210 | 1.065 | −0.049 | 0.230 | | | | | |

FIG. 2 has a "fork", where the last step receives material (and information) from two chains, each with just one step. This may be seen as a simplified version of the manufacturing of a small computer, putting together two components, say a mother board and a power source, as a last step. Here, in addition to the training set of five observations, a prediction set with two additional observations is used to show the prediction phase of the analysis.

Note that step 21 is identical to step 11 in FIG. 1 above, and hence not shown again below. The three models have the following properties shown in table 5.

granulation, but after centering and scaling they here are identical in values to simplify the examples. Hence also the PLS model of this step is identical to that of step 11.

Referring to FIG. 2, in step 22, the X-data have the same number of variables and the same values as step 12 in FIG. 1. However, since there is no step preceding step 22 in the forked model, the PLS model is not identical, and hence the table of data and results is given below. Only one PLS component is significant.

Step 22 includes data (X5 and Y5), score (t5), and model coefficients (w*, c, and b). In table 6, both the prediction set observations 6 and 7 fit the model within the 5% level.

TABLE 6

| obs/vec | x51 | x52 | x53 | y5 | t5 | DModX | PmodX |
|---|---|---|---|---|---|---|---|
| 1 | −0.364 | −0.355 | −0.287 | −0.276 | −0.580 | | |
| 2 | 0.197 | 0.096 | 0.164 | 0.153 | 0.266 | | |
| 3 | 0.427 | 0.454 | 0.423 | 0.431 | 0.752 | | |
| 4 | −0.358 | −0.279 | −0.395 | −0.422 | −0.598 | | |
| 5 | 0.098 | 0.084 | 0.095 | 0.113 | 0.160 | | |
| 6 | 0.332 | 0.510 | 0.579 | | 0.816 | 3.260 | 0.048 |
| 7 | −0.368 | −0.540 | −0.521 | | −0.820 | 2.573 | 0.085 |
| w* and c 1 | 0.600 | 0.548 | 0.584 | 0.587 | | | |
| b y5 | 0.352 | 0.321 | 0.342 | | | | |

Step 23: Simulated manufacturing step 23 comprises three process variables, including three relative position measurements (x31, x32, and x33) of the motherboard and of the power source. There are two y-variables, two measured voltages (y31, y32) on the mounted computer. As previous steps, the data are centered and scaled.

In this step 23, the influence of steps 21 and 22 is modeled by means of the three scores resulting in the step 21 and step 22 models. These three vectors (t41, t42, and t5) are appended to the X-matrix of step 23 to give totally six variables in X6 (x31, x32, x33, t41, t42, and t5) of step 23.

The PLS analysis of these data gives three components, denoted t61, t62, and t63, and step 23 data (X6 and Y6), scores, and model coefficients (w*, c, and b) are shown below in table 7. The prediction set observation 7 fits the model, while no 6 is a significant outlier as shown in table 7. In a DmodX-plot no 6 would be significantly outside its normal range, indicating that this observation deviates from the model of the normal observations and classified as an outlier Transmitting information and data between the different steps can be performed in different directions. In FIG. 2, step 23 may also transmit information and data to step 21 and/or step 22. Analogously, in FIG. 1 step 13 may also transmit information and data to step 12.

Figure 5:
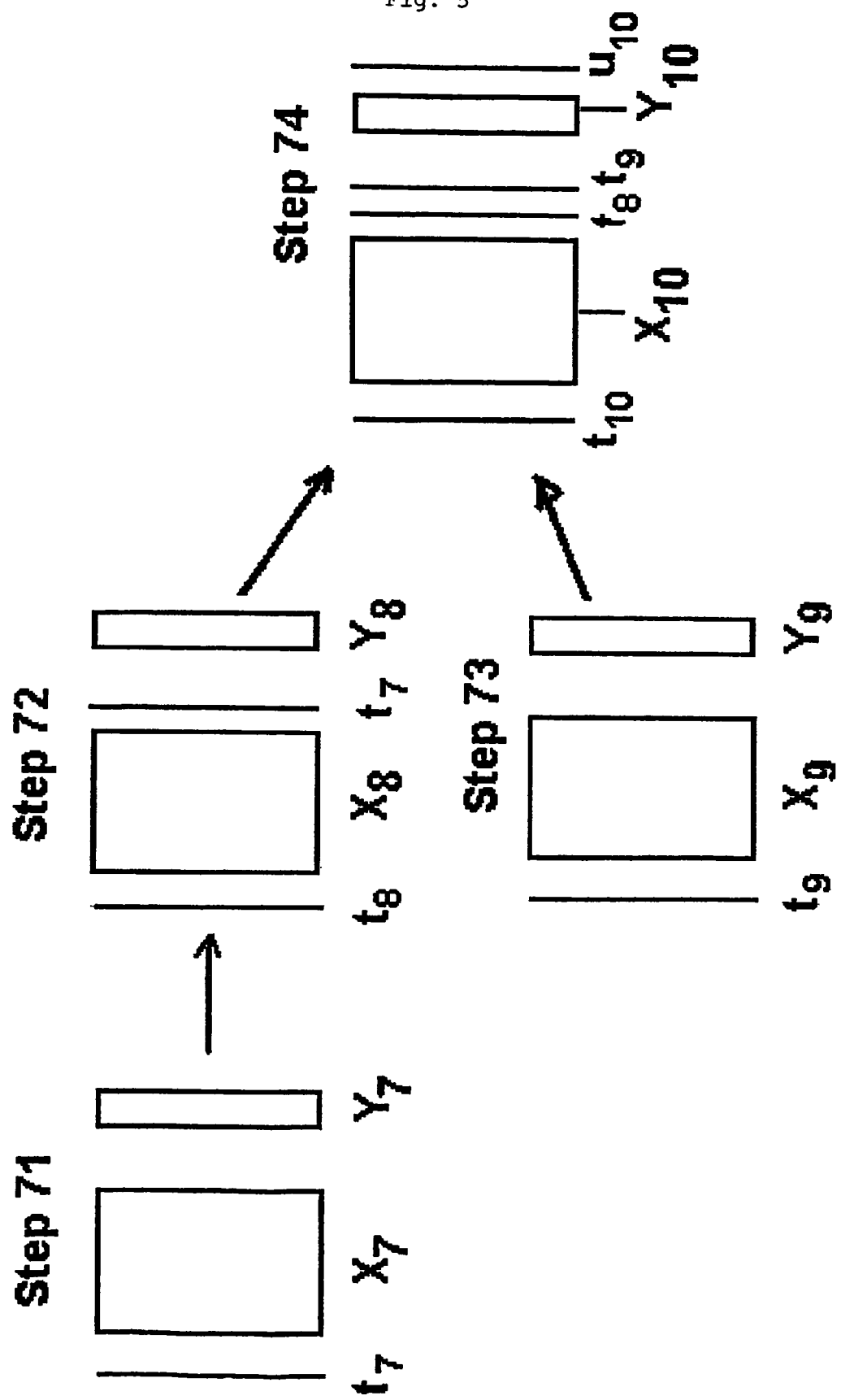
FIG. 5 shows the data structure for a simple process with four steps with two merging branches in the final step.

In the following text the invention will further be described in detail. Data are divided into blocks for each step, with XJ indicating process data measured on STEP J and Yj indicating quality and other result data measured on the same step. FIG. 5 shows the data structure for a simple process with four steps (71,72, 73, and 74) with two merging branches in the final step 74. The scores $t_j$ (t7, t8, t9, and t10) carry the information of $X_j$ (X7, X8, X9, and X10) to later steps, and the scores $u_j$ (U7, U8, U9, and U10) summarize the Y-block (Y7, Y8, Y9, and Y10) of the same step.

For simplicity we assume only one significant component for each step. In reality, of course they are usually more.

Hence, the model estimate in phase one has a number of sub models, one for each step (71 to 74 in FIG. 5), plus a

TABLE 7

| obs/vec | x61 | x62 | x63 | t41 | t42 | t5 | y61 | y62 | t61 | t62 | t63 | DmodX | PModX |
|---|---|---|---|---|---|---|---|---|---|---|---|---|---|
| 1 | 0.409 | −0.12 | 0.18 | 0.28 | 0.062 | −0.58 | 0.633 | −0.128 | 0.05 | 0.644 | 0.427 | | |
| 2 | −0.098 | 0.086 | −0.013 | −0.553 | 0.143 | 0.266 | −0.446 | −0.189 | −0.312 | −0.28 | −0.36 | | |
| 3 | 0.099 | 0.479 | 0.301 | 0.951 | −0.127 | 0.752 | 0.411 | 1.31 | 1.321 | −0.226 | −0.065 | | |
| 4 | −0.156 | 0.075 | −0.086 | −0.175 | 0.434 | −0.598 | 0.422 | −0.875 | −0.448 | 0.587 | −0.299 | | |
| 5 | −0.254 | −0.52 | −0.382 | −0.503 | −0.513 | 0.16 | −1.02 | −0.117 | −0.611 | −0.725 | 0.297 | | |
| | | | | | | | pred y1 | pred y2 | | | | | |
| 6 | −0.353 | −0.999 | −0.683 | 0.963 | −0.048 | 0.816 | −0.573 | 1.002 | 0.494 | −0.78 | 0.406 | 5.555 | 0.019 |
| 7 | 0 | −0.2 | −0.1 | 1.366 | −0.213 | −0.82 | 1.072 | 0.358 | 0.614 | 0.81 | 0.703 | 4.143 | 0.057 |

| | w1 | w2 | w3 | w4 | w5 | w6 | c1 | c2 |
|---|---|---|---|---|---|---|---|---|
| w* and c 1 | 0.189 | 0.336 | 0.282 | 0.765 | −0.07 | 0.427 | 0.474 | 0.929 |
| w* and c 2 | 0.22 | 0.178 | 0.188 | 0.255 | 0.496 | −0.757 | 1.009 | −0.534 |
| w* and c 3 | 0.502 | −0.552 | 0.061 | 0.222 | −0.595 | −0.206 | −0.051 | 0.313 |
| b y61 | 0.286 | 0.367 | 0.32 | 0.609 | 0.498 | −0.551 | | |
| b y62 | 0.215 | 0.044 | 0.181 | 0.643 | −0.517 | 0.736 | | |

With FIG. 2, the two prediction set observations are then used in the prediction phase of the sequential analysis. The prediction set (observation 6 and 7) give the values of scores and residual standard deviations (DmodX) shown above. It is seen that observation 6 is rather far away from the model and is a significant outlier.

With more variables it would definitely be even clearer. A contribution plot would show that the main variables deviating are x31 and x33, i.e., two of the step 23 process variables.

With respect to distances to the model (residual standard deviations) of the five training set observations (1-5) and the two prediction set observations, the first one (no 6) is seen to be outside the critical limit, and hence classified as an outlier.

mechanism for carrying the sequential transfer of quality parameters from a step forwards (down stream) in the chain.

There are several possible variants of algorithms to estimate the sequential model from the training set.

A simple algorithm would be to start with a simple PLS model for each step being LEFTMOST in a chain, above step 71 and step 73. The number of components in each step model ($A_j$) is determined so that the scores of each step ($t_j$) adequately capture the systematic variation in the corresponding $X_j$ matrices. These scores are then included among the X-variables in the next model to the right, either as just extensions of the X-BLOCK, or, as separate blocks, one per component. Thus, in the second variant, if there were $A_j$ components in the model to the left of the present step, there will be 1+$A_j$ blocks in a hierarchical PLS model of the present step.

The resulting score (s) of the second step models (one per chain in this example) are then carrying the information to the next step to the right in the chain, etc., until either the process chain finishes, or merges with another chain as in FIG. 5.

In steps where several chains merge, the procedure is the same, except that a set of scores appear from each chain, and the extension of X includes all these scores, either just as additional variables, or, as a set of one variable blocks, $A_j+A_k$ in number, assuming that the previous models in two merging chains were $A_j$ and $A_k$, respectively.

The model is now finished, and can be used in a prediction phase (with additional variables, data etc.) starting with the earliest steps, and sequentially moving the resulting scores down the chain (s) together with the variables measured in each sub-sequent step.

In a more elaborate model, one can weave the estimation back and forth, using the model with only one component above as a start. Then, in THE"BACK-WARD"PHASE, the models are updated in a standard NIPALS fashion starting from the RIGHTMOST (final) Y-block. That will, to begin with, produce a u-vector for this final block, which then is carried backward to previous blocks together with its Y-summaries (UT), giving after one NIPALS-PLS round a joint u-vector for the previous step, which then is carried backwards another step, etc. Once the end is reached, one has t-scores for the LEFTMOST step sub models, and the directions are changed to for-wards, ETC., until convergence.

The X-blocks of all steps are then deflated by t*p', and a second component started just as in any hierarchical PLS model.

After an adequate number of model components (cross-validation or other estimation of model complexity), the model is finished, and can be used in a prediction phase starting with the earliest steps, and sequentially moving the resulting scores down the chain (s) together with the variables measured in each subsequent step.

What is claimed is:

1. A method for monitoring of and fault detection in a process chain in an industrial process, said industrial process comprising at least a first sub-process, Step 12, 23, 72, having first variables, $X_2$, and at least one second sub-process, Step 11, 21, 22, 71, 73, having second variables, $X_1$, arranged in a process chain, said first sub-process being performed after said second sub-process in said process chain, said method comprises the steps of:
    collecting data including said second variables and calculating a multivariate sub-model based on said collected data comprising weighted averages, t11, t12, t41, t42, t5, t7, t8, t9, for said second variables for the at least one second sub-process, Step 11, 21, 22, 71, 73;
    receiving in the first sub-process, Step 12, 23, 72, from the at least second sub-process, Step 11, 21, 22, 71, 73, said weighted averages, t11, t12, t41, t42, t5, t7, t8, t9;
    collecting data including said first variables related to the first sub-process, Step 12, 23, 72; and
    calculating a multivariate sub-model for the first sub-process, Step 12, 23, 72, based on said collected data including said first variables and said weighted averages, t11, t12, t41, t42, t5, t7, t8, t9.

2. A method according to claim 1, characterized by the step of transmitting information or data related to the multivariate sub-model calculated for the first sub-process, Step 12, 23, 72, to a third sub-process, Step 13, 74.

3. A method according to claim 1, characterized by the step of performing information or data feedback from the first sub-process, Step 12, 23, 72, to the at least one second sub-process, Step 11, 21, 22, 71, 73.

4. A method according to claim 1, characterized in that the data collected for each sub-process comprises process data.

5. A method according to claim 1, characterized in that the step of transferring information received comprises sequential transferring of quality parameters by means of multivariate sub-model score values, t1, t2, . . . , tn, between the sub-processes in the process chain.

6. A method according to claim 1, characterized in that arranging the collected data for the first sub-process, Step 12, 23, 72, in one matrix and calculating the sub-model for the first sub-process, Step 12, 23, 72, using a principal component analysis like method.

7. A method according to claim 1, characterized in that arranging the collected data for the first sub-process, Step 12, 23, 72) is in a first, X, and a second, Y, matrix and calculating the sub-model for the first sub-process, Step 12, 23, 72, using a PLS like method.

8. A method according to claim 7, characterized by first matrix X) comprises process data and the second matrix, Y, comprises quality data.

9. A method according to claim 1, characterized by defining at least one plot, such as score plots, residual plots, residual standard deviation, DmodX plots, contribution plots, or scaled raw data plots for the interpreting the models and occurring process faults.

10. A method according to claim 9, characterized in that outlier detection is provided by analysis of said at least one plot.

11. A method according to claim 1, characterized by using a number of multivariate sub-model observations comprising a prediction set to simulate the process chain.

12. A method according to claim 1, characterized by using a number of multivariate sub-model observations comprising a prediction set to perform on-line monitoring in the process chain.

13. A computer program product storing computer readable code means which, when run on a computer system, makes the computer system perform the steps according to claim 1.

14. A computer program product according to claim 13 comprising computer readable code means which, when run on a computer system, makes the computer system perform the following additional step:
    transmitting relevant information or data to a third sub-process, Step 13, 74.

15. A first apparatus for monitoring of and fault detection in a process chain in an industrial process employing multivariate data methods, said first apparatus comprising calculating means for calculating a first multivariate sub-model for a first sub-process, Step 12, 23, 72, wherein said first apparatus comprises means for receiving from at least a second apparatus information or data related to at least a second multivariate sub-model on said collected data comprising weighted averages, t11, t12, t41, t42, t5, t7, t8, t9, for said second variables calculated for at least a second sub-process, Step 11, 21, 22, 71, 73, in said industrial process and that said calculating means is arranged to calculate the first multivariate sub-model based on the information or data received from said apparatus and said second sub-process, Step 11, 21, 22, 71, 73.

16. A first apparatus according claim 15, characterized in that it comprises means for transmitting information or data to a third apparatus.

17. An apparatus according to claim 15, characterized by means for performing information or data feedback to the second apparatus.

* * * * *

UNITED STATES PATENT AND TRADEMARK OFFICE
CERTIFICATE OF CORRECTION

PATENT NO. : 7,523,384 B2
APPLICATION NO. : 10/519569
DATED : April 21, 2009
INVENTOR(S) : Svante Wold It is certified that error appears in the above-identified patent and that said Letters Patent is hereby corrected as shown below:

In column 2 at line 52, please delete "under-tand-ing" and insert --understanding-- therefor.

Signed and Sealed this
Fifth Day of April, 2011

David J. Kappos
*Director of the United States Patent and Trademark Office*